Figure 1:
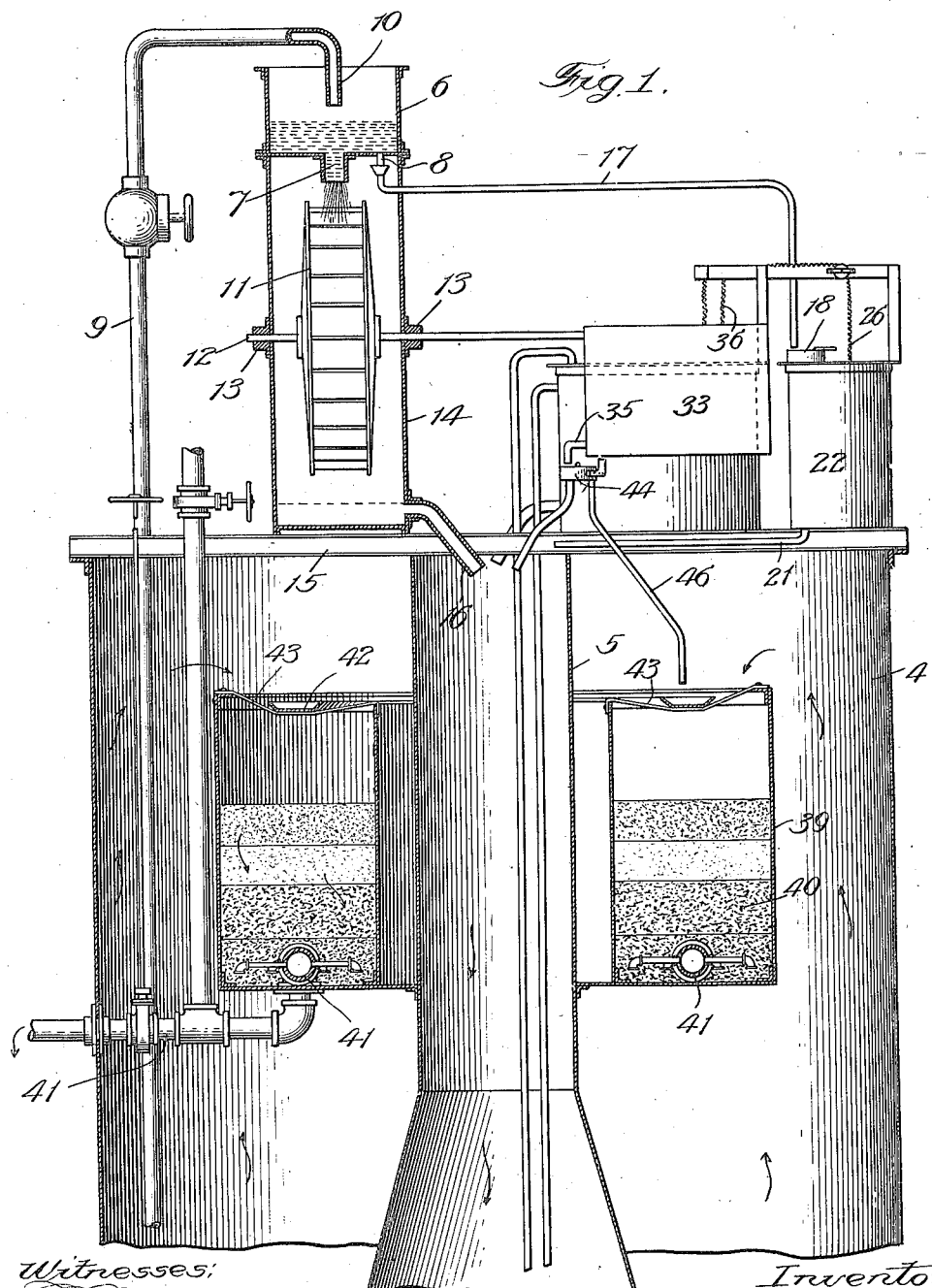

W. M. JEWELL.
ART OF WATER FILTRATION.
APPLICATION FILED NOV. 6, 1912.

1,158,225.

Patented Oct. 26, 1915.
2 SHEETS—SHEET 1.

Witnesses:

Inventor:
William M. Jewell,
By Dyrenforth, Lee, Chritton & Wiles, Attys.

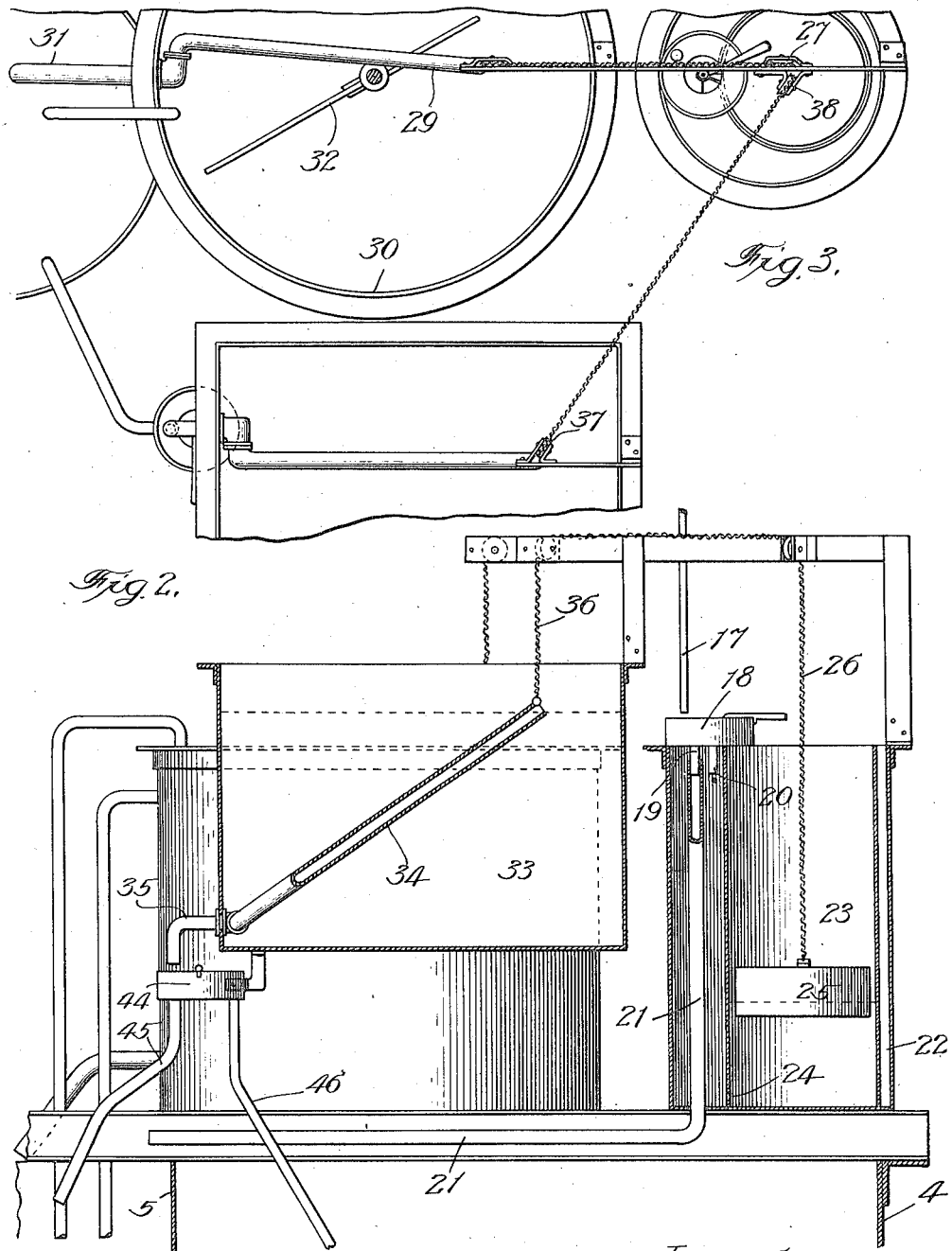

UNITED STATES PATENT OFFICE.

WILLIAM M. JEWELL, OF CHICAGO, ILLINOIS, ASSIGNOR TO JEWELL ENGINEERING COMPANY, OF CHICAGO, ILLINOIS.

ART OF WATER FILTRATION.

1,158,225.  Specification of Letters Patent.  Patented Oct. 26, 1915.

Application filed November 6, 1912. Serial No. 729,744.

*To all whom it may concern:*

Be it known that I, WILLIAM M. JEWELL, a citizen of the United States, residing at Chicago, in the county of Cook and State of Illinois, have invented a new and useful Improvement in the Art of Water Filtration, of which the following is a specification.

In treating water for the purpose of either purification or softening, in accordance with the common practices, the chemicals introduced therein produce finely divided precipitates of salts particularly of lime, such as for example, carbonate of lime, which, by reason of their minuteness, do not settle during the treatment of the water, but on the contrary, remain suspended therein and are drawn off with the treated water. The final stage in the purification or softening of water consists in filtering it to remove foreign particles therefrom, this being more advantageously performed by passing the treated water through a sand or quartz filter. The use of quartz filters as a filtration medium for water treated in accordance with the common practices presents the great disadvantage of soon becoming clogged in such a way as to seriously impair its operation requiring replacement of the filter-mass, with resultant expense and interruption to the water-filtration process.

I have discovered that the cause of the impairment of the filters, as above stated, is due to the uniting, or cementing of the fine precipitates of salts, above referred to, with the particles of the filter-mass, by reason of their relatively great affinity for the particles of the filter-mass while in a non-crystallized condition, as exists in common practice when the particles pass to the filtering bed, by reason of the fact that the time which elapses between the formation of the precipitates, and the entrance of the latter into the filter-mass is less than that required for the crystallizing of the precipitates.

My object is to prevent the uniting of the cementitious precipitates produced, as above stated, to the particles of the filter-mass and thus avoid the disadvantage above stated.

My invention, generally stated, consists preferably in introducing into the water to be filtered and intermediate the settling chamber and filter, and preferably immediately before the water reaches the filter, any suitable coagulant which will neutralize the attractive tendency, one to the other, of the particles of the filter-mass and the cementitious salts drawn off with the water from the settling chamber, whereby the filter-mass will be maintained in normally operative condition.

I have devised my improved method for use more particularly in connection with the treatment of water to soften it and have therefore chosen to describe it, and illustrate an apparatus for practising it, in this connection, though without wishing to be understood as intending to limit it to such use.

Referring to the accompanying drawings—Figure 1 is a broken view in vertical sectional elevation of a water-softening apparatus constructed in accordance with my invention and adapted to the practising of my improved method, certain parts of the apparatus illustrated being shown in section. Fig. 2 is a similar view of a part of the apparatus illustrated in F.g. 1, showing, in section, the coagulant tank and the mechanism for controlling the discharge of the coagulant therefrom; and Fig. 3, a broken plan view of the structure illustrated in Fig. 2.

The apparatus illustrated, except as to details hereinafter referred to, is the same in principle and mode of operation as the water-softening apparatus illustrated and described in United States Letters Patent No. 912,802, granted February 16, 1909, to W. McA. Bruce, and thus a general description only of those features of the illustrated apparatus which are disclosed in said patent will suffice.

The precipitating tank of the apparatus is represented at 4 and houses a downtake conduit 5. Surmounting the tank 4 is a water-box 6, the bottom of which contains a relatively large outlet 7 and a relatively smaller outlet 8, and a pipe 9 leading from the source of supply of water to be softened, having its discharge end 10 positioned for discharging the water into the box 6, from which latter it flows through the large outlet 7 onto an overshot water-wheel 11 journaled at its shaft 12 in bearings 13 in a casing 14 housing said wheel and supported on cross-bars 15 extending across the top of the tank 4, said casing containing an outlet 16 adapted to discharge the spent water into the upper end of the conduit 5, a portion of the water introduced into the box 6 discharging through a pipe 17 into a water-distributing box 18. The box 18 contains two outlets 19 and 20, the outlet 19 discharging into a pipe 21 which empties into the conduit 5, and the pipe 20 discharging into a regulating-box 22 containing a chamber 23 which communicates with the interior of the box 22 through an opening 24, and contains a float 25 connected, by means of a chain 26 running over suitably supported pulleys 27 and 28, with the upper end of a lift-pipe 29 located in a water-softening-solution tank 30 and pivoted at its lower end to a pipe-section 31 adapted to discharge into the conduit 5, the tank 30 containing a stirring device 32 operatively connected with the wheel-shaft 12 for agitating the solution in the holder 30.

In operating the apparatus, the water to be treated runs into the box 6 from which it discharges through the large outlet 7 onto the wheel 11 for rotating the latter, and thence through the pipe 16 into the conduit 5, for treatment, and through the smaller outlet 8 into the pipe 17 and thence into the water-distributing box 18, where it is divided to cause water to flow from the outlet 20 into the box 22 and thence into the chamber 23 at such a rate of flow as will permit the lift-pipe 29 to lower at such a speed as will cause the softening solution in the tank 30 to flow through the outlet 31 into the conduit 5, in correct proportion to the raw water entering said conduit, the water flowing from the box 18 through its outlet 19 preferably discharging into the conduit 5.

In treating certain waters in accordance with present practices, it is desirable to introduce into the conduit 5 for mixture with the water to be treated, a liquid coagulant of any desirable kind, such as iron sulfate, and thus a coagulant tank, as for example the tank 33, is provided. The tank 33 contains a pivoted lift-pipe 34 which communicates with a discharge-pipe 35 and is connected at its free end with a chain 36 running over suitably supported pulleys 37 and 38 and connected with the float 25 for causing the pipe 34 to swing downwardly at its free end as the float rises and thus control the flow of coagulant from the tank 33.

Surrounding the upper end portion of the conduit 5, but spaced from the side wall and top of the tank 4, is a filter-casing 39, closed excepting at its top, and containing a filter-mass 40 composed of strata of gravel, torpedo gravel, and quartz, as illustrated, and in conformance with common practice. The outlet through which the softened, filtered water is drawn off from the filter is represented at 41, and across the top of the filter is supported a trough 42, preferably continuous, as by means of the cross-bars 43, it being understood from the foregoing description that the water as it rises in the tank 4 overflows onto the top of the filter-mass and by gravity percolates therethrough and discharges through the outlet 41.

The water treated by the softening solution discharged from the tank 30 and the coagulant, when used, descends in the conduit 5 and rises in the tank 4 overflowing into the filter and finally discharging through the outlet 41, and during this operation the precipitates thus formed descend to the bottom of the tank, but there remains in the water salts of lime or magnesia in finely divided condition which, under the action of the water, rise with it in the tank 4 and flow into the filter.

In carrying out my improved process in the preferred manner to prevent the fine precipitates of the salts carried by the water to the filter from uniting with the particles of the filter-mass, I introduce into the water as it flows into the top of the filter a coagulant which either without chemical action envelops the particles of precipitate or of the filter-mass, or by chemically combining with the salts, produces an enveloping precipitate of a gelatinous nature, and thus neutralizes the attracting tendency of the said particles to the said cementitious precipitates in the water. The coagulant used may be of any desirable kind, either chemical, as for example, ordinary alum, potassium or ammonium-aluminum sulfate, aluminum sulfate, ferric or ferrous sulfate, ferric or ferrous chlorid, sodium phosphate or sodium aluminate, or physical or insoluble, as for example, starch products, oils, clay or kaolin, which latter, without chemical action, envelop the particles of filter-mass or precipitates. Where a coagulant is used in the initial treatment of the water for softening or purifying the latter, the same coagulant may be used for introduction into the water for coöperation with the filter-mass as above stated, and as a convenient way of supplying coagulant to different parts of the apparatus as stated, I have shown the coagulant tank 33 as discharging into a measuring-box 44, one outlet of which, represented at 45, discharging into the conduit 5 and the other outlet 46 discharging into the trough 42, where it overflows into the top of the filter and thoroughly mixes with the water.

The parts of the apparatus are so proportioned that the correct amount of the coagulant runs into the conduit 5 in accordance with well known requirements, and an amount necessary to produce the necessary neutralization of the attracting tendency of the particles of the filter-mass to the cementitious salts in the water is introduced into the water at the top of the filter, under ordinary conditions the proportions of the coagulant introduced into the conduit, to that introduced into the top of the filter, being about ten to one.

It will be manifest that my improved method of water-filtration may be used to advantage wherever it is desirable to filter water containing salts of lime or magnesia, in a filter the particles of the filter-mass of which have attractive affinity for such salts, whether the water to be filtered is water which has been purified, clarified, softened, or otherwise treated, and regardless of any particular form of apparatus.

What I claim as new and desire to secure by Letters Patent is—

1. The method of water-purification, which consists in mixing with the hard-water to be treated, chemicals to precipitate soluble impurities which produce cementitious precipitates, settling the water so treated in a settling chamber, passing the water from the settling chamber into a filter, and introducing into the water after the settling operation and before it enters the bed of the filter, a coagulant for neutralizing the attractive tendency of the more or less finely divided particles forming the filtering bed, to the cementitious precipitates in the water to thereby maintain in normally operative condition the said particles forming the filter bed against impairment by cementation.

2. The method of water-purification, which consists in mixing with the hard-water to be treated, chemicals to precipitate soluble impurities which produce cementitious precipitates, settling the water so treated in a settling chamber, passing the water from the settling chamber into a filter, and introducing into the water after the settling operation and before it enters the bed of the filter, material of such character as to produce a coating upon the cementitious precipitates and neutralize the attractive tendency of the more or less finely divided particles forming the filtering bed and the cementitious precipitates, one to the other, to thereby maintain in normally operative condition the more or less finely divided particles forming the filtering bed against impairment by cementation.

3. The method of water-purification, which consists in mixing with the hard-water to be treated, chemicals to precipitate soluble impurities which produce cementitious precipitates, settling the water so treated in a settling chamber, introducing into the water before the settling operation a coagulant for augmenting the settling of said precipitates, thereupon passing the water from the settling chamber into a filter, and introducing into the water after the settling operation and before it enters the bed of the filter, a coagulant for neutralizing the attractive tendency of the more or less finely divided particles forming the filtering bed, to the cementitious precipitates in the water, to thereby maintain in normally operative condition the said particles forming the filtering bed against impairment by cementation.

4. The method of water-purification, which consists in mixing with the hard-water to be treated, chemicals to precipitate soluble impurities which produce cementitious precipitates, settling the water so treated in a settling chamber, passing the water from the settling chamber into a filter, and introducing into the water, after the settling operation and before it enters the bed of the filter, a substance capable of chemically combining with the cementitious precipitates in the water and producing a coagulated precipitate having no affinity for the more or less finely divided particles forming the filter bed, to thereby maintain in normally operative condition the said particles forming the filtering bed against the impairment by cementation.

5. The method of water-purification, which consists in mixing with the hard-water to be treated, chemicals to precipitate soluble impurities which produce cementitious precipitates, settling the water so treated in a settling chamber, passing the water from the settling chamber into a filter, and introducing into the water after the settling operation and before it enters the bed of the filter and while the water to be filtered continues to flow into the filter, material of such character as to produce a coating upon the cementitious precipitates and neutralize the attractive tendency of the more or less finely divided particles forming the filtering bed, and the cementitious precipitates, one to the other, to thereby maintain in normal operative condition the said particles forming the filtering bed against impairment by cementation.

WILLIAM M. JEWELL.

In presence of—
  L. Heislar,
  J. Landesman.